(12) United States Patent
Yang et al.

(10) Patent No.: US 11,856,552 B2
(45) Date of Patent: Dec. 26, 2023

(54) DEVICES AND METHODS FOR AUTOMATICALLY LABELLING HIGH-ACCURACY INDOOR LOCALIZATION AND DETERMINING LOCATION INFORMATION

(71) Applicant: Huawei Technologies Co., Ltd., Shenzhen (CN)

(72) Inventors: Ganghua Yang, Shanghai (CN); Yun Yaw Chu, Boulogne Billancourt (FR); Abdellatif Zaidi, Boulogne Billancourt (FR); Mohamed Kamoun, Boulogne Billancourt (FR); Mustapha Amara, Boulogne Billancourt (FR); Sami Mekki, Boulogne Billancourt (FR); Mejed El Jabri, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/650,705

(22) Filed: Feb. 11, 2022

(65) Prior Publication Data
US 2022/0167305 A1    May 26, 2022

Related U.S. Application Data

(63) Continuation of application No. PCT/EP2019/071870, filed on Aug. 14, 2019.

(51) Int. Cl.
*H04W 64/00* (2009.01)
*H04B 17/336* (2015.01)
(Continued)

(52) U.S. Cl.
CPC ........ *H04W 64/006* (2013.01); *H04B 7/0626* (2013.01); *H04B 17/336* (2015.01);
(Continued)

(58) Field of Classification Search
CPC .. H04W 64/006; H04W 24/10; H04B 7/0626; H04B 17/336; H04L 25/03006; H04L 2025/0377; G01S 5/02521; G01S 5/02524
See application file for complete search history.

(56) References Cited

U.S. PATENT DOCUMENTS

| | | | | |
|---|---|---|---|---|
| 5,852,630 A | * | 12/1998 | Langberg | ............ H04L 27/2647 |
| | | | | 375/219 |
| 8,548,497 B2 | * | 10/2013 | Lymberopoulos | ... G01C 21/206 |
| | | | | 455/456.6 |

(Continued)

FOREIGN PATENT DOCUMENTS

EP    3266259 A1 *   1/2018   ........... G01S 5/0252

OTHER PUBLICATIONS

Aguerri, I. et al., "Distributed Variational Representation Learning", arXiv:1807.04193v3 [stat.ML], Mar. 31, 2019, pp. 1-35.
(Continued)

*Primary Examiner* — Siu M Lee
(74) *Attorney, Agent, or Firm* — Slater Matsil, LLP (57) ABSTRACT

A device, in a training phase, obtains Channel State Information (CSI) for one or more links between another device and at least one Access Point (AP), and in the training phase, estimates location information of the other device based on at least one geometric localization technique; and generates a database comprising CSI of the one or more links, each CSI being associated with an estimated location information. Further, a device, in a testing phase, obtains a database from another device, wherein the database comprises CSI of one or more links, each CSI being associated with an estimated location information, and in the testing phase, the device estimates CSI for one or more links between the
(Continued)

device and at least one AP, and determine location information based on the estimated CSI of the one or more links and the database.

17 Claims, 8 Drawing Sheets

(51) Int. Cl.
   *H04B 7/06* (2006.01)
   *H04L 25/03* (2006.01)
   *H04W 24/10* (2009.01)

(52) U.S. Cl.
   CPC ....... *H04L 25/03006* (2013.01); *H04W 24/10* (2013.01); *H04L 2025/0377* (2013.01)

(56) References Cited

U.S. PATENT DOCUMENTS

| | | | |
|---|---|---|---|
| 9,084,217 B2 | 7/2015 | Wax et al. | |
| 9,143,176 B2 | 9/2015 | Wax et al. | |
| 9,578,466 B2 | 2/2017 | Xiao et al. | |
| 9,775,117 B1* | 9/2017 | Jafarian | H04W 52/367 |
| 10,383,086 B2* | 8/2019 | Chan | H04W 24/02 |
| 10,641,610 B1* | 5/2020 | Karon | H04W 4/029 |
| 11,546,720 B2* | 1/2023 | Ivanov | H04W 4/33 |
| 2006/0009236 A1* | 1/2006 | Bose | G01S 5/0268 |
| | | | 455/456.1 |
| 2016/0286519 A1* | 9/2016 | Tzur | G01S 5/06 |
| 2017/0108575 A1* | 4/2017 | Yang | G01S 5/0268 |
| 2018/0348333 A1* | 12/2018 | Bhatti | H04W 4/029 |
| 2019/0137621 A1 | 5/2019 | Zhang et al. | |
| 2020/0304953 A1* | 9/2020 | Georgy | H04W 4/026 |

OTHER PUBLICATIONS

Bahl, P. et al., "RADAR: An In-building RF-based User Location and Tracking System", Proceedings IEEE Infocom 2000, Conference on Computer Computer Communications, 29th Annual Joint Conference of the IEEE Computer and Communications Societies, vol. 2, Mar. 26-30, 2000, pp. 775-784.

Chen, C. et al., "Achieving Centimeter-Accuracy Indoor Localization on WiFi Platforms: A Frequency Hopping Approach", IEEE Internet of Things Journal, Feb. 2017, vol. 4, No. 1, pp. 111-121.

Chintalapudi, K. et al., "Indoor Localization Without the Pain", MobiCom '10, Sep. 20-24, 2010, pp. 173-184.

Ericsson, "System-level evaluation of OFDM—further considerations", TSG-RAN WG1 #35, R1-031303, Lisbon, Portugal, Nov. 17-21, 2003, 6 pages.

Roy, R. et al., "ESPRIT-Estimation of Signal Parameters via Rotational Invariance Techniques", IEEE Transactions on Acoustics, Speech and Signal Processing, vol. 37, No. 7, Jul. 1989, pp. 984-995.

Schmidt, R. O., "A Signal Subspace Approach to Multiple Emitter Location and Spectral Estimation", University Microfilms International, Stanford University, Copyright 1982, 24 pages.

Sun, W. et al., "Augmentation of Fingerprints for Indoor WiFi Localization Based on Gaussian Process Regression", IEEE Transactions on Vehicular Technology, vol. 67, No. 11, Nov. 2018, pp. 10896-10905.

Vasisht, D. et al., "Sub-Nanosecond Time of Flight on Commercial Wi-Fi Cards", arXiv:1505.03446v1 [cs.NI], May 13, 2015, pp. 1-14.

Wu, G. et al., "A Deep Neural Network-Based Indoor Positioning Method using Channel State Information", Workshop on Computing, Networking and Communications (CNC), May 20-24, 2018, pp. 290-294.

Youssef, M. et al., "The Horus WLAN Location Determination System", MobiSys '05: The Third International Conference on Mobile Systems, Applications, and Services, USENIX Association, Jun. 5, 2005, pp. 205-218.

* cited by examiner

DEVICES AND METHODS FOR AUTOMATICALLY LABELLING HIGH-ACCURACY INDOOR LOCALIZATION AND DETERMINING LOCATION INFORMATION

CROSS-REFERENCE TO RELATED APPLICATIONS

This application is a continuation of International Application No. PCT/EP2019/071870, filed on Aug. 14, 2019, the disclosure of which is hereby incorporated by reference in its entirety.

TECHNICAL FIELD

The present disclosure relates generally to the field of determining location information, and particularly to automatically labeling high-accuracy indoor localization in a Wireless Local Area Network (WLAN). To this end, the disclosure proposes a device, such as a server device, that, in a training phase, is configured to generate a database including Channel State Information (CSI) of the links between another device (for example, a wireless device) and Access Points (APs) and associate each CSI with location information. The disclosure also proposes a device, such as a mobile device or an infrastructure device that, in a testing phase, determines the location of a mobile device based on the estimated CSI of a link between this mobile device and one or more APs.

BACKGROUND

Generally, indoor localization for mobile handsets offers a new paradigm of location-aware services in a multiplicity of scenarios and environments, such as an office, a building receiving public, smart manufacturing, logistics, etc. However, this new function is challenged with two major difficulties. The first difficulty is the need for sub-meter accuracy that is required by the relying services. The second difficulty is the unavailability of conventional satellite based localization signals.

Moreover, using a dedicated infrastructure will degrade the cost-effectiveness, and may be incompatible with large set of mobile handsets. That is why relying on existing wireless communication infrastructure and standards is a desired solution. For such a solution, two major classes of schemes have been investigated for indoor localization: geometrical techniques and fingerprinting strategies. Geometrical approaches employ one or more techniques, like time of arrival, time difference of arrival, direction of arrival. They are very sensitive to the presence and the variation of a multi-path profile of the channel. That is why they offer the best performance in line-of-sight configurations. Unfortunately, such scenarios are encountered seldom in indoor environments. On the other hand, fingerprinting techniques rely on learning a labelled radio map that can include different levels of details about the channel, which is experienced by the mobile handset: signal strength with respect to multiple sites, signal level on different channels, the coarse or fine frequency response in one or multiple channels.

Although these techniques are more resilient to the presence of multi-paths, their implementation requires to cope with two main issues as follows.

Data labelling with an alternative ground truth localization system: the training set needs to be labelled with accurate positions that can be obtained with manual measurements or with alternative accurate localization system. Both options imply significant cost, which is coming from labour expenses or from the presence of an alternative infrastructure. These additional expenses will degrade the cost effectiveness of the fingerprinting solutions.

Change of environment and the need to update the labelled dataset: the indoor wireless environments are prone to unpredictable variations of the channel that is experienced in each location. These variations will degrade the performance experienced with fingerprinting techniques, because of the obsolescence of the labelled data set. Therefore, an update of this set needs to be performed on a regular basis so as to keep the performance of fingerprinting solutions above a predefined threshold.

The data labelling in fingerprinting schemes received little attention despite their impact on the accuracy and the cost effectiveness of the final solution. Conventional fingerprinting schemes dedicate insufficient consideration to the process of preparation and the update of the labelled training test. Generally, three main classes of strategies may be considered, in order to tackle this preparation as follows.

Manual or automatic training in predefined set of locations: this is the basic scheme, it involves manual measurement of the channel metrics in a predefined set of locations and label them with the related positions. Moreover, it involves a high labour cost for the initial preparation and for the update. With the decline in recent years of the cost of unmanned ground vehicles (UGV), the manual training can be performed by an UGV doing and automatic scan in the predefined locations. The measured data that is stored during the training phase can be either deterministic or probabilistic. In the deterministic approach, the acquired data is compacted in a single representation (e.g. best measurement, average of several measurements. With probabilistic strategies, a statistical information containing the distribution of the collected metrics is stored during the training.

Manual training with reference points and augmentation schemes: in this scheme, the channel is measured in few locations and an interpolation approach is employed to label non measured locations. Eventually the labelled radio map includes two sets of points, points where real measurement have been performed, and points whose information has been obtained with an interpolation scheme based on the previous point.

Virtual radio maps built from calibrated models: this approach is based an empirical model of the path-loss. The parameters of this model are obtained by fitting a set of manual or automatic measurements. The model using these parameters is employed to generate a virtual radio map with arbitrary resolution. The localization is then performed using a nearest point approach or one of its variations.

However, all these conventional schemes need a prior manual or automatic work to obtain a labelled data set. This limits the cost-effectiveness of the related solution.

SUMMARY

In view of the above-mentioned disadvantages, the embodiments of the present invention aim to improve the conventional devices and methods. An objective is to provide devices and methods for an accurate and cost-effective indoor localization in a WLAN. The localization should be based on an automatically created and high-accuracy labelled data set.

One or more of the objectives is achieved by the embodiments provided in the enclosed independent claims. Advantageous implementations of the embodiments are further defined in the dependent claims.

A first aspect of the disclosure provides a device, particularly a server device, configured to, in a training phase: obtain Channel State Information (CSI), for one or more links between another device and at least one Access Point (AP); estimate location information of the other device, particularly mobile device, based on at least one geometric localization technique; and generate a database comprising CSI of the one or more links, each CSI being associated with an estimated location information.

The device of the first aspect may be a server device. The device may comprise circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

The device (e.g., a server device) obtains the CSI and estimates location information of the other device (e.g., a wireless device). For example, the device may use a geometrical localization techniques relying on time of arrival, direction of arrival or combination of both in an opportunistic way. For instance, when the accuracy is assessed to be under a pre-determined threshold. The aim of this assessment is to guarantee an accurate localization which will be used as a label for the channel state information that is collected.

Moreover, the device may collect the CSI and label them with the location information obtained with the alternative method. Furthermore, the device may continuously update the labelled radio map as long as the aforementioned assessment is positive. In addition, when these conditions are not satisfied, the device may employ a fingerprinting technique, e.g., a linear, a non-linear regression, a nearest neighbour, etc., in order to localize the other device (e.g., the wireless device, a mobile device) based on its CSI. In some embodiments, the labelled CSI is fed to a neural network operating in training mode and following an information bottleneck cost function.

The device of the first aspect supports accurate and cost-effective indoor localization in a WLAN based on a labelled data set.

In an implementation form of the first aspect, the device is further configured to, in the training phase, determine an accuracy parameter for each estimated location information based on a predefined parameter.

In a further implementation form of the first aspect, the predefined parameter is one or more of:
a predefined number of available channels;
a high signal to noise ratio on a specific link between the other device and an AP;
the other device comprising an alternative localization sensor operating in an optimal condition;
a statistical confidence metric.

In a further implementation form of the first aspect, the device is further configured to, in the training phase, if the accuracy parameter is above a threshold value, update the generated database, wherein the database is updated at a specific time or at predetermined time intervals.

In a further implementation form of the first aspect, the device is further configured to, in the training phase, train a fingerprint technique based on the generated database.

In some embodiments, the device (e.g., the server device) may provide a geometrical localization service that may be used to provide the location information, e.g., upon request from another device. Moreover, the device may also feed the labelled data set employed to train the neural network. The labelled data can also feed with a set of CSIs along with location information obtained by an existing service in the mobile device and using alternative methods such as a Global Positioning System (GPS), a light detection and ranging (LIDAR), a radio detection and ranging (RADAR), etc.

In a further implementation form of the first aspect, the fingerprint technique is based on a deep learning method, and in particular based on a neural network; and the device is further configured to train the neural network based on feeding it with the CSI of the one or more links, labeled with the associated location information according to the database.

In a further implementation form of the first aspect, the at least one geometric localization technique is based on one or more of:
a Direction Of Arrival (DOA) localization technique;
a Time Difference Of Arrival (TDOA) localization technique;
a Time Of Arrival (TOA) localization technique.

In particular, a geometrical localization service may be provided which may determine location information based on the CSIs. This service may employ one or more geometrical localization techniques (e.g., DOA, TDOA, TOA) to obtain location information based on a set of CSIs.

In a further implementation form of the first aspect, the alternative localization sensor is based on:
a GPS sensor;
an indoor or outdoor visibility sensor.

In a further implementation form of the first aspect, the deep learning method is based on:
a linear regression algorithm; or
a non-linear regression algorithm; or
a nearest neighbor algorithm; or
a variational auto-encoder using information bottleneck principle.

In a further implementation form of the first aspect, the device is further configured to, in the testing phase, obtain CSI for one or more links related to the other device; determine a quality parameter for the at least one CSI; determine, upon receiving a request for localization, a respective location information according to the request, based on the at least one CSI and the quality parameter.

In a further implementation form of the first aspect, if the quality parameter is above a threshold value, the location information is determined based on using the at least one geometric localization technique; or if the quality parameter is smaller than the threshold value, the location information is determined based on the trained fingerprinting technique.

In a further implementation form of the first aspect, the CSI for the one or more links is determined based on estimating a channel for consecutive data packets during a predefined time interval; or determining a series of vectors corresponding to the frequency response experienced by a set of successive data packets of a used wave-form.

In a further implementation form of the first aspect, the quality parameter for the at least one CSI is determined based on one or more of:
a received signal strength;
an average Signal to Interference plus Noise Ratio (SINR) of all subcarriers;
a channel capacity;

an Effective Exponential SNR Mapping, EESM, with Multiple Input Multiple Output, MIMO, extensions;
a statistical confidence interval.

In a further implementation form of the first aspect, the device is further configured to, in the training phase, estimate, in parallel, a location information of the other device based on the at least one geometric localization technique and a location information of the other device based on the trained fingerprint technique, and update the generated database, if an accuracy parameter for the location information estimated based on the trained fingerprint technique indicates a better accuracy than an accuracy parameter for the location information estimated based on the at least one geometric localization technique.

A second aspect of the disclosure provides a device, particularly mobile device, configured to, in a testing phase, obtain a database from another device, wherein the database comprises CSI of one or more links, each CSI being associated with an estimated location information; estimate CSI for one or more links between the device and at least one Access Point (AP); and determine location information based on the estimated CSI of the one or more links and the database.

The device may be a mobile device. Moreover, the device of the second aspect may comprise a circuitry, the circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

In an implementation form of the second aspect, the device is further configured to, in a testing phase, obtain a trained model, in particular a trained fingerprint technique from the other device; and determine the location information based on the trained fingerprinting technique.

The device of the second aspect supports accurate and cost-effective indoor localization in a WLAN based on a labelled data set.

A third aspect of the disclosure provides a method for a device, particularly server device, the method comprising, in a training phase, determining CSI for one or more links between another device and at least one AP; estimating a location information of the other device, particularly mobile device, based on at least one geometric localization technique; and generating a database comprising CSI of the one or more links, each CSI being associated with an estimated location information.

In an implementation form of the third aspect, the method further comprises, in the training phase, determining an accuracy parameter for each estimated location information based on a predefined parameter.

In a further implementation form of the third aspect, the predefined parameter is one or more of:
a predefined number of available channels;
a high signal to noise ratio on a specific link between the other device and an AP;
the other device comprising an alternative localization sensor operating in an optimal condition;
a statistical confidence metric.

In a further implementation form of the third aspect, the method further comprises, in the training phase, if the accuracy parameter is above a threshold value, updating the generated database, wherein the database is updated at a specific time or at predetermined time intervals.

In a further implementation form of the third aspect, the method further comprises, in the training phase, training a fingerprint technique based on the generated database.

In a further implementation form of the third aspect, the fingerprint technique is based on a deep learning method, and in particular based on a neural network; and the method further comprises training the neural network based on feeding it with the CSI of the one or more links, labeled with the associated location information according to the database.

In a further implementation form of the third aspect, the at least one geometric localization technique is based on one or more of:
a direction of arrival localization technique;
a time difference of arrival localization technique;
a time of arrival localization technique.

In a further implementation form of the third aspect, the alternative localization sensor is based on:
a GPS, sensor;
an indoor or outdoor visibility sensor.

In a further implementation form of the third aspect, the deep learning method is based on:
a linear regression algorithm; or
a non-linear regression algorithm; or
a nearest neighbor algorithm; or
a variational auto-encoder using information bottleneck principle.

In a further implementation form of the third aspect, the method further comprises, in the testing phase, obtaining CSI for one or more links related to the other device; determining a quality parameter for the at least one CSI; and determining, upon receiving a request for localization, a respective location information according to the request, based on the at least one CSI and the quality parameter.

In a further implementation form of the third aspect, if the quality parameter is above a threshold value, the location information is determined based on using the at least one geometric localization technique; or if the quality parameter is smaller than the threshold value, the location information is determined based on the trained fingerprinting technique.

In a further implementation form of the third aspect, the CSI for the one or more links is determined based on estimating a channel for consecutive data packets during a predefined time interval; or determining a series of vectors corresponding to the frequency response experienced by a set of successive data packets of a used wave-form.

In a further implementation form of the third aspect, the quality parameter for the at least one CSI is determined based on one or more of:
a received signal strength;
an average signal to interference plus noise ratio of all subcarriers;
a channel capacity;
an effective exponential SNR mapping with multiple input multiple output extensions;
a statistical confidence interval.

In a further implementation form of the third aspect, the method further comprises, in the training phase, estimating, in parallel, a location information of the other device based on the at least one geometric localization technique and a location information of the other device based on the trained fingerprint technique, and updating the generated database, if an accuracy parameter for the location information estimated based on the trained fingerprint technique indicates a better accuracy than an accuracy parameter for the location information estimated based on the at least one geometric localization technique.

The method of the third aspect achieves the same advantages as the device of the first aspect.

A fourth aspect of the disclosure provides a method for a device, particularly a mobile device, the method comprising, in a testing phase, obtaining a database from another device, wherein the database comprises CSI of one or more links, each CSI being associated with an estimated location information; estimating CSI for one or more links between the device and at least one AP; and determining location information based on the estimated CSI of the one or more links and the database.

In an implementation form of the fourth aspect, the method further comprises, in a testing phase, obtaining a trained model, in particular a trained fingerprint technique from the other device; and determining the location information based on the trained fingerprinting technique.

The method of the fourth aspect achieves the same advantages as the device of the second aspect.

Overall, a localization technique using two components, namely a geometrical localization based on the CSIs and a fingerprinting localization, e.g. performed by a neural network, is proposed. The fingerprinting technique may run in two possible modes. In the first mode, which is the training mode, the fingerprinting technique is fed by a labelled data set comprising CSIs associated with corresponding location information. Moreover, in the second mode, i.e., a localization mode, the fingerprinting technique is fed by a set of CSIs and determines location information.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which FIG. 1 schematically illustrates a device, particularly a server device for generating a database in a training phase, according to an embodiment of the invention.

DETAILED DESCRIPTION OF ILLUSTRATIVE EMBODIMENTS

Figure 1:
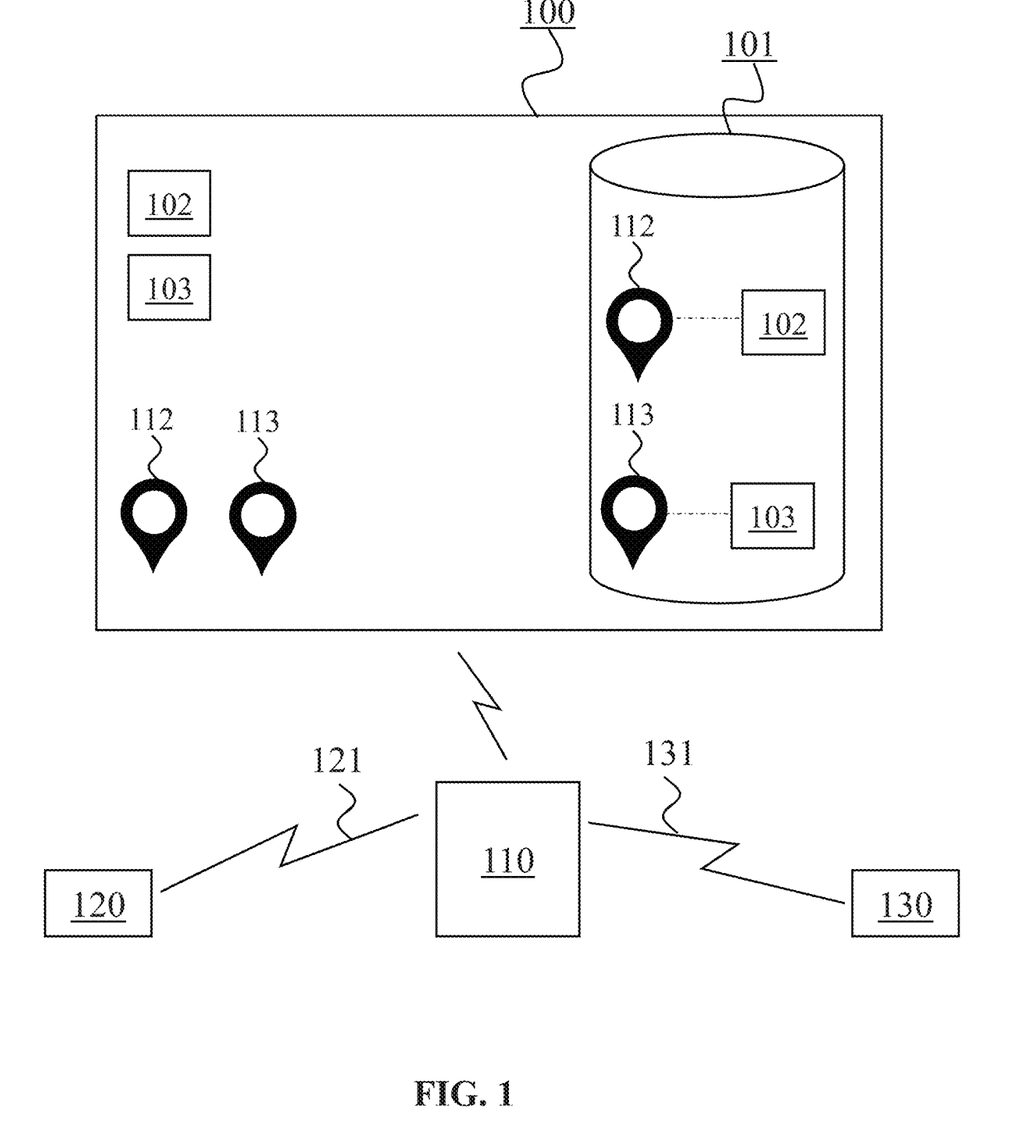

FIG. 1 schematically illustrates a device 100, particularly a server device, for generating a database 101 in a training phase, according to an embodiment of the invention.

The device 100 may be, for example, a server device, configured to, in the training phase, obtain CSI 102, 103, for one or more links 121, 131 between another device 110 and at least one AP 120, 130.

The device 100 is further configured to, in the training phase, estimate location information 112, 113 of the other device 110, particularly of a mobile device, based on at least one geometric localization technique.

The device 100 is further configured to, in the training phase, generate a database 101 comprising CSI 102, 103 of the one or more links 121, 131, each CSI 102, 103 being associated with an estimated location information 112, 113.

The device 100 may comprise a circuitry (not shown in FIG. 1). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 2:
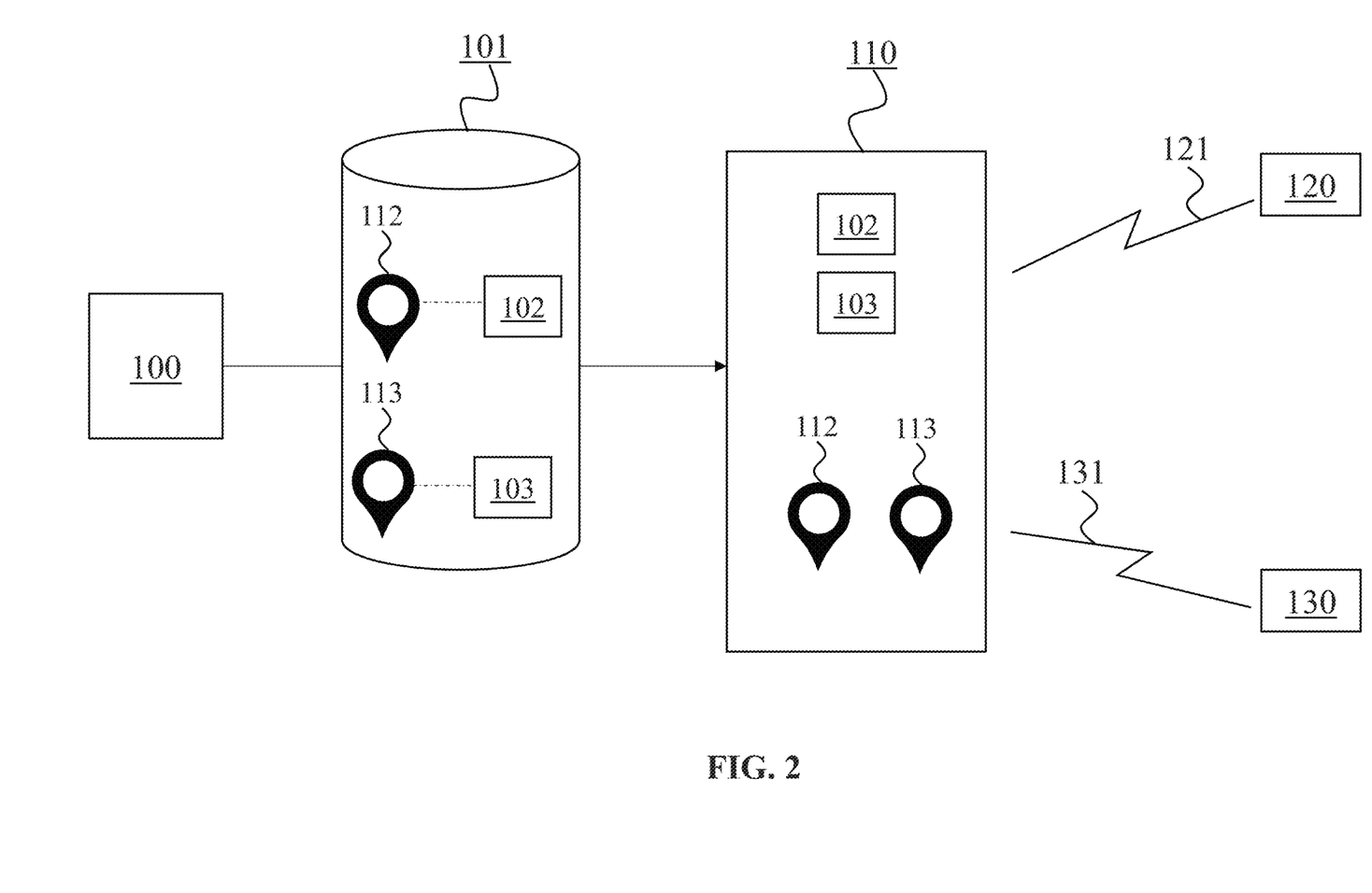
FIG. 2 schematically illustrates a device, particularly a mobile device for determining location information in a testing phase, according to an embodiment of the invention.

FIG. 2 schematically illustrates a device 110, particularly a mobile device, for determining location information 112, 113 in a testing phase, according to an embodiment of the invention.

The device 110 may be, for example, a mobile device, configured to, in the testing phase, obtain a database 101 from another device 100, wherein the database 101 comprises CSI 102, 103 of one or more links 121, 131, each CSI 102, 103 being associated with an estimated location information 112, 113.

The device 110 is further configured to, in the testing phase, estimate CSI 102, 103 for one or more links 121, 131 between the device 110 and at least one Access Point (AP) 120, 130.

The device 110 is further configured to, in the testing phase, determine location information 112, 113 based on the estimated CSI 102, 103 of the one or more links 121, 131 and the database 101.

The device 110 may comprise a circuitry (not shown in FIG. 2). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Figure 3:
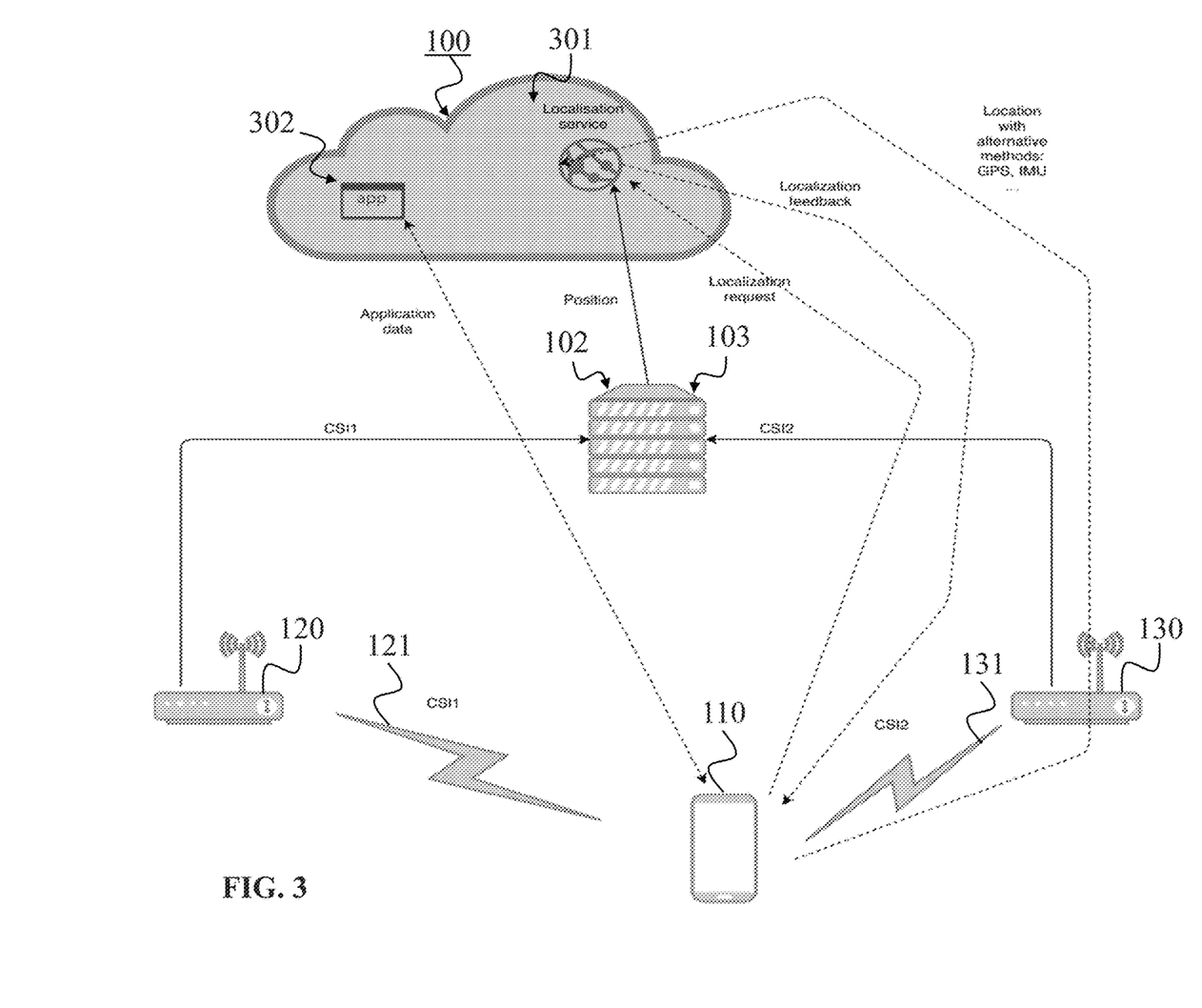
FIG. 3 is a schematic view of the mobile device including a localization service in a radio access network, according to an embodiment of the invention.

FIG. 3 shows a schematic view of a mobile device 110 including a localization service in a radio access network, according to an embodiment of the invention. In the embodiment of FIG. 3, the device 110 is connected to a server device 100 in a wireless network, and the server device 100 is capable of providing a wireless data service.

The server device 100 further has a localization service 301 and an application 302, which may be accessed by the mobile device 110. The server device 100 is connected to the wireless access network and may get the channel state information 102, 103 of the links 121, 131 between the mobile device 110 and each access point (AP) 120, 130, separately.

The channel state information 102, 103 (e.g., in FIG. 3 is denoted $CSI_i$ for the $i^{th}$) AP 120, 130 may include a channel estimate collected for consecutive packets during a predefined duration T. Moreover, with the OFDM(A) waveforms, a CSI may be obtained based on a series of vectors corresponding to the frequency response experienced by a set of successive packets.

Figure 4A:
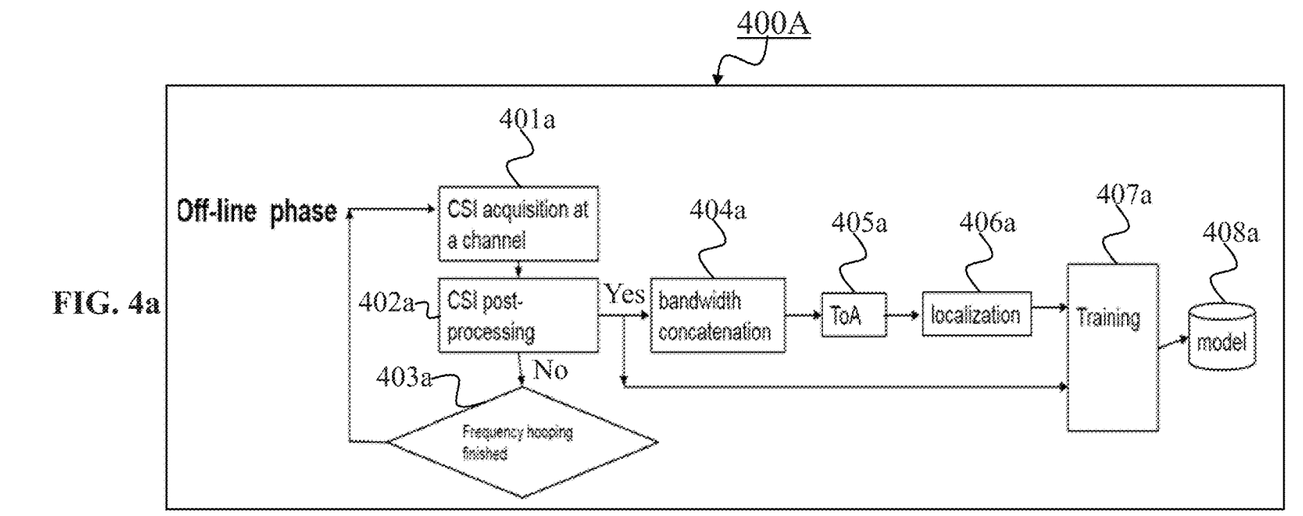
FIGS. 4a and 4b are schematic views of examples of processing methods in an off-line phase (FIG. 4a) and an online phase (FIG. 4b), according to an embodiment of the invention.
Figure 4B:
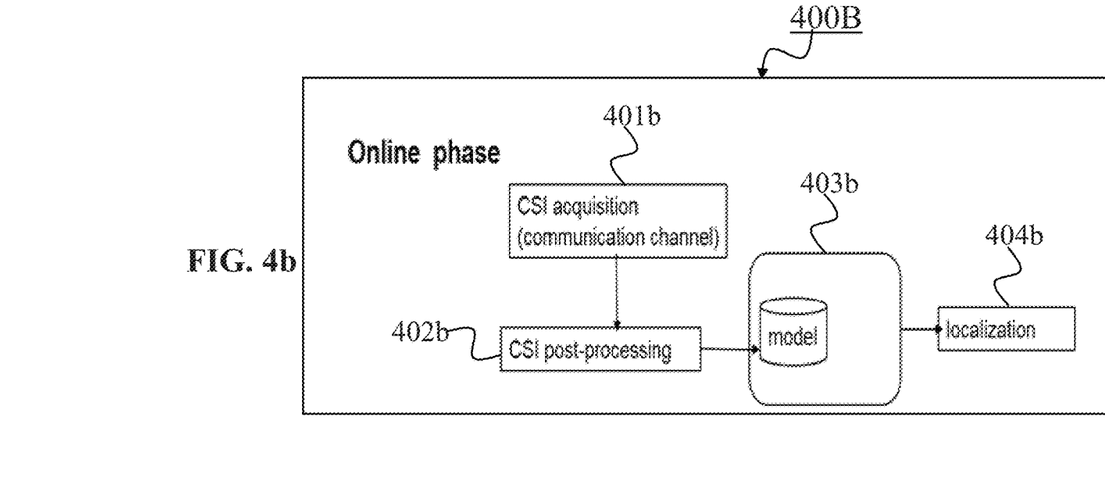

FIG. 4a and FIG. 4b show schematic views of examples of processing methods 400A and 400B in an off-line phase (FIG. 4a) and in an online phase (FIG. 4b), respectively, according to an embodiment of the invention.

The architecture is organized around two phases according to FIG. 4a and FIG. 4b. In FIG. 4a during an offline phase where labelled CSI are collected, and in FIG. 4b in an online phase where a fingerprinting technique, here exemplarily a neural network, is trained with the aforementioned labelled data is inferring location information based on the CSI.

Moreover, when the traffic load is low, the network may run in a learning mode. In this case, CSI is collected from one or more mobile devices over several channels, regardless of whether they ask for a localization service or not. The network may employ resource allocation strategies that favour wide channels and trigger, when possible, a channel hopping scheme.

With reference to FIG. 4a, the following steps may be performed, for example, by the device 100, which may be the server device, and/or by the device no, which may be the mobile device. Without limiting the present disclosure, in the following the method 400A is discussed based on being performed by the device 100, and the method 400B is discussed based on being performed by the device no.

At 401a, the device 100 obtains CSI for different channels 121, 131.

At 402a, the device 100 performs the CSI post-processing, for example, in order to determine, if the CSI have a good quality. Moreover, when it is determined "No" the device goes to step 403a, however, when it is determined "Yes", the device goes to step 404a.

At step 403a, the device 100 determines that the frequency hopping is finished.

At step 404a, the device 100 performs a bandwidth concatenation, and it may provide the results to the training unit (e.g., the device may go to step 407a).

At step 405a, the device 100 runs a time of arrival technique, in order to determine location information.

At step 406a, the device 100 determines location information.

At step 407a, the device 100 trains a fingerprint technique.

At step 408a, the device 100 obtains a trained model.

Moreover, the quality of each set of CSIs related to each device no may be evaluated. An example of a channel quality assessment procedure may be obtained based on various metrics that can be employed, separately or jointly, in order to assess the quality of the CSI. For example, the following metrics may be used:

Received Signal Strength (obtained from the WiFi card),

Average power over all subcarriers, $1/N \Sigma_{k=1}^{N}|h_k|^2$, where N is the number of subcarriers Channel capacity, e.g. according to $\Sigma_k \log_2(1+\sigma^2/|h_k|^2)$, where $\sigma^2$ is the variance of the noise, Effective Exponential SNR Mapping (EESM) with multiple input multiple output extensions.

Furthermore, the good quality CSIs may be employed to perform geometrical localization.

Moreover, the method 400B may be performed by the device 110.

At 401b, the device 110 obtains CSI for different communication channels 121, 131.

At 402b, the device no performs the CSI post processing.

At 403b, the device 110 uses the trained model.

At 404b, the device no determines the location information.

Figure 5:
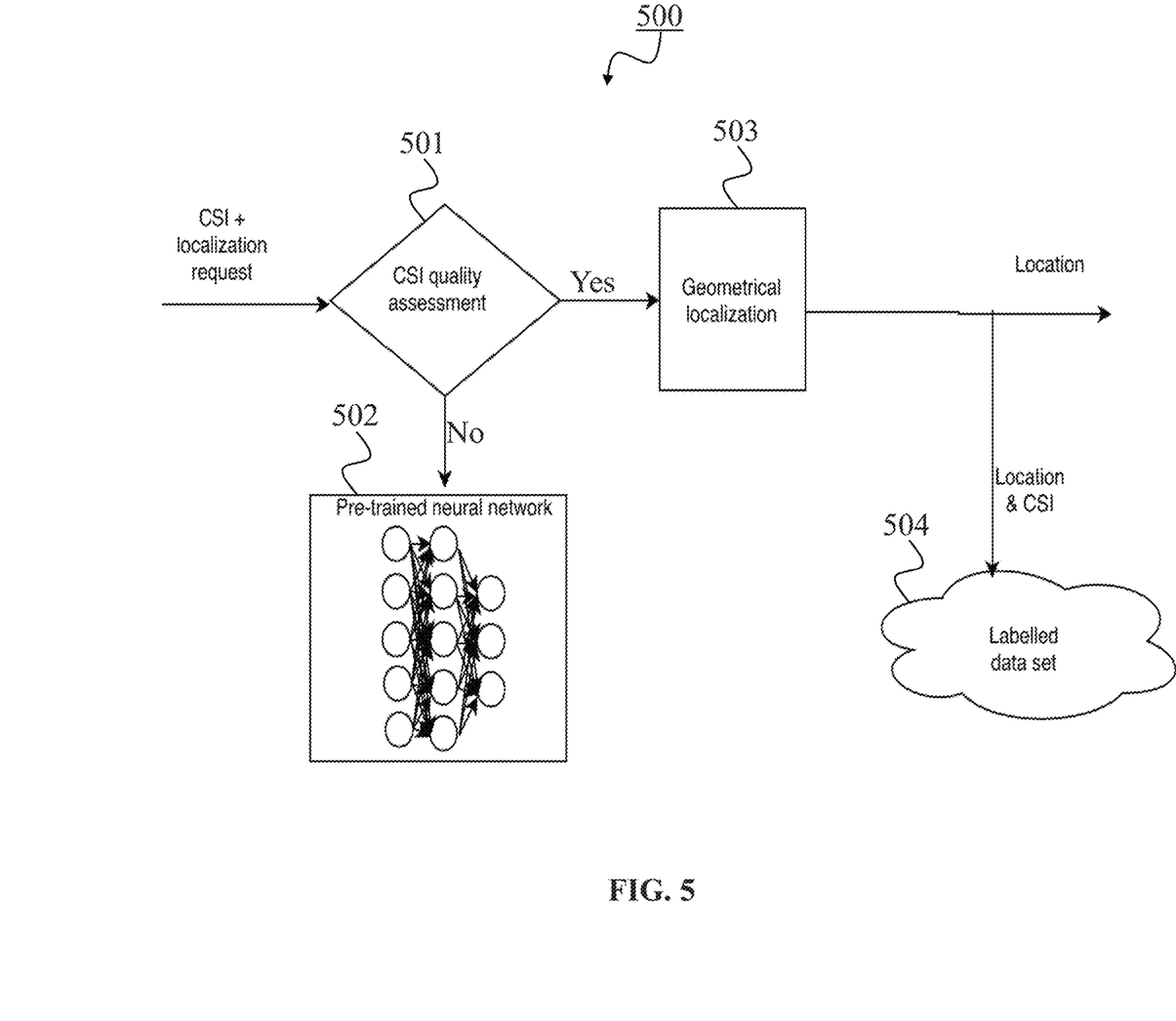
FIG. 5 is a schematic view of channel state information processing.
Figure 6:
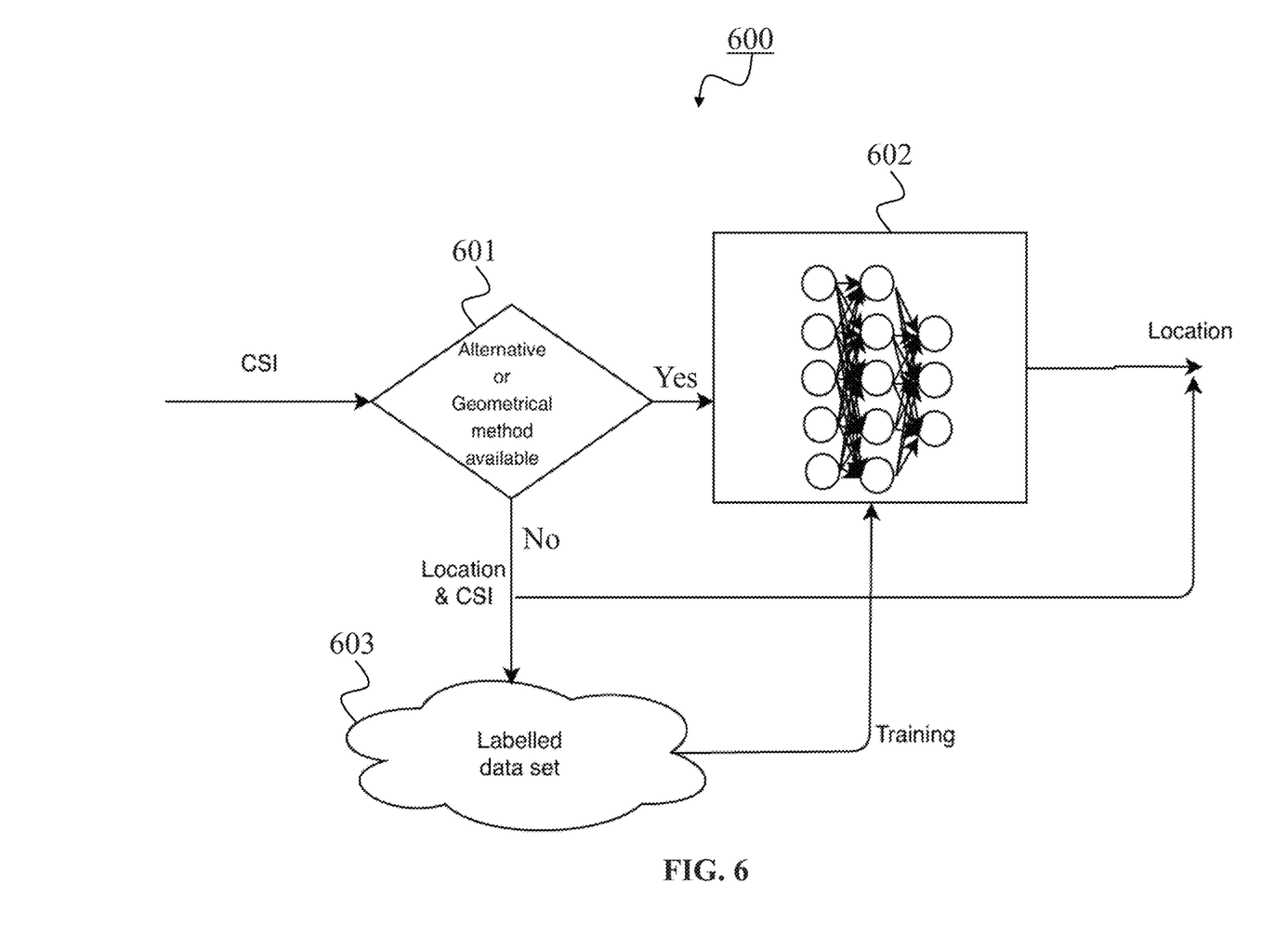
FIG. 6 is a schematic view of channel state information processing in a training mode.

The obtained location information, along with the set of CSIs, are then sent to, e.g., a neural network as a training labelled data, according to the flowchart illustrated in FIG. 6. Moreover, when the network runs in normal mode, the localization requests may be treated according to the flowchart illustrated in FIG. 5.

FIG. 5 is a schematic view of CSI processing.

In the procedure 500 of FIG. 5, the following steps may be performed, for example, by the device 100 being the server device and/or by the device no being the mobile device. Without limiting the present disclosure, in the following the procedure 500 is discussed based on being performed by the device 100.

At step 501, the device 100 performs the CSI quality assessment (determining accuracy parameter). Moreover, when it is determined that the CSI has a moderate or bad quality, the device 100 goes to step 502, in which the location is inferred using the pre-trained neural network. However, when it is determined that the CSI has a good quality, the device goes to step 503 where a geometrical localization technique is employed.

Moreover, at step 504 the CSI is fed to the training set for late update of the neural network.

For instance, when the set of collected CSIs has a good quality, at step 503, the localization service employs one or more geometrical techniques to localize the mobile device 100. When a request for localization is received, the localization service employs an interpolation scheme using the trained neural network to localize the mobile device no based on its set of CSIs.

FIG. 6 shows a schematic view of CSI processing in a training mode.

In the procedure 600 of FIG. 6, the following steps may be performed, for example, by the device 100 being the server device and/or by the device no being the mobile device. Without limiting the present disclosure, in the following the procedure 600 is discussed based on being performed by the device 100.

At step 601, the device 100 determines if alternative or a geometric method is available. Moreover, when it determined "Yes", the device goes to step 602, however, when it is determined "No", the device 100 goes to step 603.

At step 603, the device 100 trains the model (e.g., the fingerprint technique). Moreover, the trained model may further be used for determining a location information.

At step 603, the device 100 uses the labeled data set in the database 101. Moreover, it may provide the labelled data set to the model to be trained.

Figure 7:
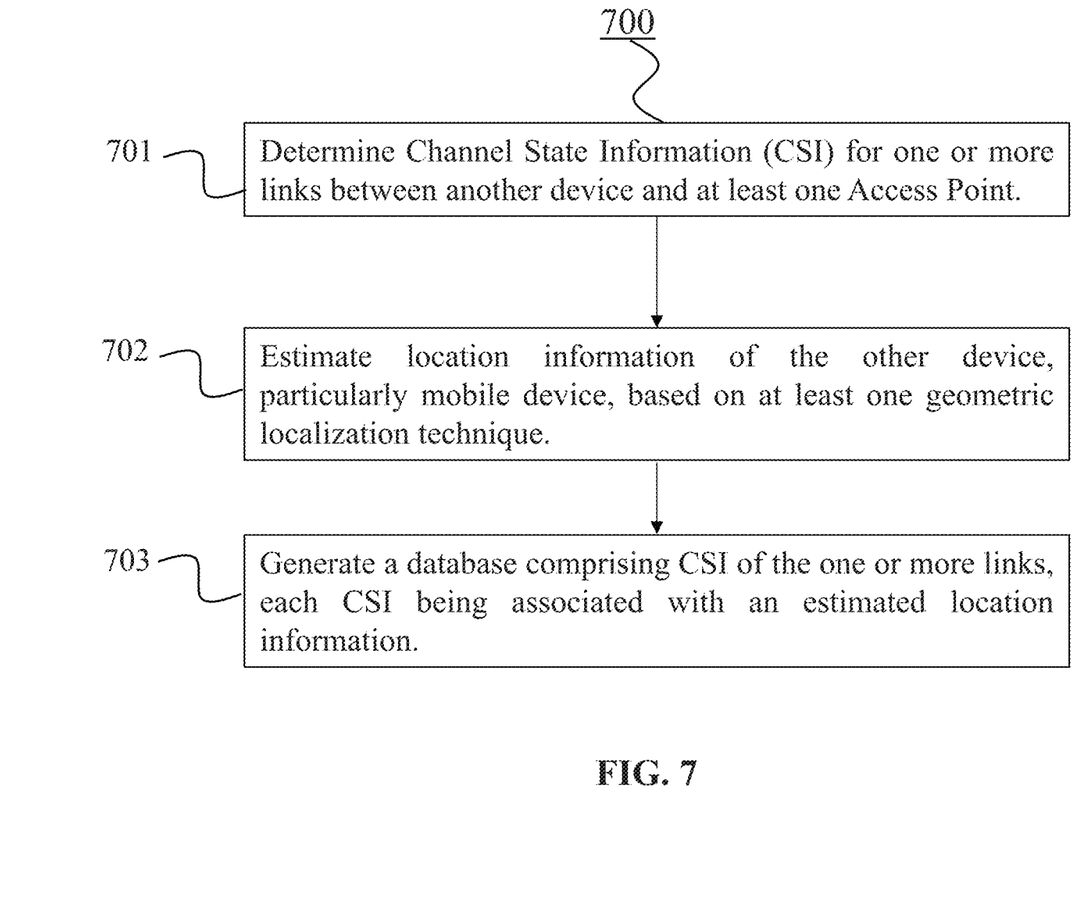
FIG. 7 is a flowchart of a method for a device particularly server device, according to an embodiment of the invention.

FIG. 7 shows a method 700 according to an embodiment of the invention for a device 100, particularly server device. The method 700 comprises, in a training phase, performing the following steps. The method 700 may be carried out by the device 100, as it described above.

The method 700 comprises a step 701 of determining CSI 102, 103, for one or more links 121, 131 between another device 110 and at least one AP 120, 130.

The method 700 further comprises a step 702 of estimating location information 112, 113 of the other device 110, particularly mobile device, based on at least one geometric localization technique.

The method 700 further comprises a step 703 of generating a database 101 comprising CSI 102, 103 of the one or more links 121, 131, each CSI 102, 103 being associated with an estimated location information 112, 113.

Figure 8:
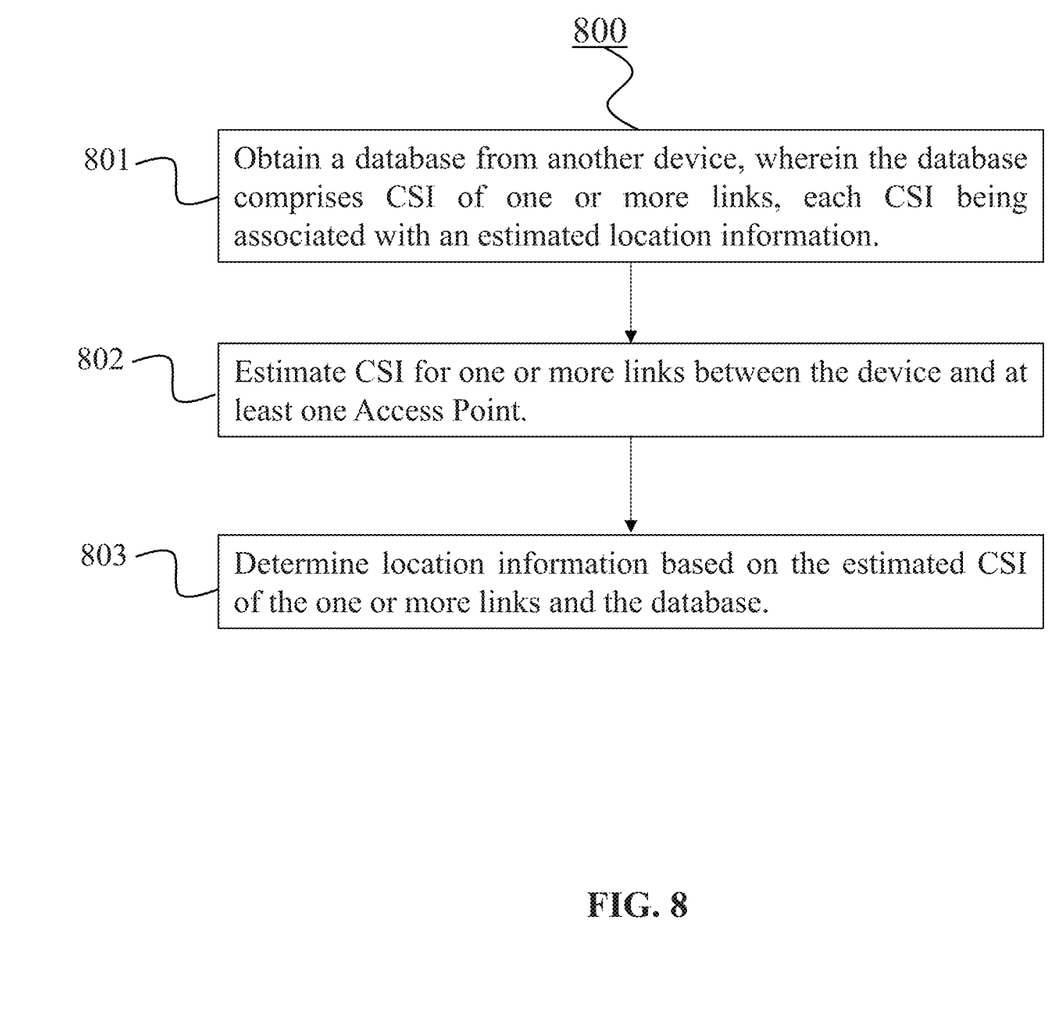
FIG. 8 is a flowchart of a method for a device particularly mobile device, according to an embodiment of the invention.

FIG. 8 shows a method 800 according to an embodiment of the invention for a device 110, particularly a mobile device, the method 800 comprising, in a testing phase, performing the following steps.

The method 800 may be carried out by the device 110, as it described above.

The method 800 comprises a step 801 of obtaining a database 101 from another device 100, wherein the database 101 comprises CSI 102, 103 of one or more links 121, 131, each CSI 102, 103 being associated with an estimated location information 112, 113.

The method 800 further comprises a step 802 of estimating CSI 102, 103 for one or more links 121, 131 between the device 110 and at least one AP 120, 130.

The method 800 further comprises a step 803 of determining location information 112, 113 based on the estimated CSI 102, 103 of the one or more links 121, 131 and the database 101.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A server device, comprising:
   at least one processor; and
   a non-transitory computer readable storage medium storing a program that is executable by the at least one processor, the program comprising instructions to:
   in a training phase, obtain one or more samples of Channel State Information (CSI) for one or more links between another device and at least one Access Point (AP);
   obtain one or more estimates of location information of the another device based on at least one geometric localization technique, each estimate of location information corresponding to at least one sample of the one or more samples of CSI for the one or more links between the another device and the at least one AP;
   in the training phase, determine an accuracy parameter for each estimate of location information based on a predefined parameter;
   generate a database comprising the one or more samples of CSI of the one or more links, each sample of CSI being associated with at least one estimate of the one or more estimates of location information; and
   in the training phase, when a respective accuracy parameter is above a threshold value, update the generated database using the respective accurate parameter.

2. The server device according to claim 1, wherein the predefined parameter is one or more of:
   a predefined number of available channels;
   a high signal to noise ratio on a specific link between the another device and an AP of the at least one AP; or
   the another device comprising an alternative localization sensor operating in an target condition.

3. The server device according to claim 2, wherein the alternative localization sensor is based on one or more of:
   a Global Positioning System (GPS) sensor; or
   an indoor or outdoor visibility sensor.

4. The server device according to claim 1, wherein the program further comprises instructions to:
   in the training phase, when the respective accuracy parameter is above the threshold value, update the generated database using the respective accurate parameter at a specific time or at predetermined time intervals.

5. The server device according to claim 1, wherein the program further comprises instructions to:
   in the training phase, train a fingerprint technique based on the generated database.

6. The server device according to claim 5, wherein:
   the fingerprint technique is based on a neural network; and
   the program further comprises instructions to train the neural network based on feeding the neural network with the one or more samples of CSI for the one or more links, each sample of CSI being labeled with the associated at least one estimate of location information according to the database.

7. The server device according to claim 5, wherein the fingerprint technique is based on a deep learning method, and the deep learning method is based on:
   a linear regression algorithm; or
   a non-linear regression algorithm; or
   a nearest neighbor algorithm; or
   a variational auto-encoder using information bottleneck principle.

8. The server device according to claim 1, wherein the at least one geometric localization technique is based on one or more of:
   a Direction Of Arrival (DOA) localization technique;
   a Time Difference Of Arrival (TDOA) localization technique; or
   a Time Of Arrival (TOA) localization technique.

9. The server device according to claim 1, wherein the program further comprises instructions to:
   in a testing phase, perform the following:
      obtain at least one sample of CSI for one or more second links related to the another device;
      determine a quality parameter for the at least one sample of CSI for the one or more second links; and
      determine, upon receiving a request for localization, an estimate of location information according to the request, based on the at least one sample of CSI for the one or more second links and the quality parameter.

10. The server device according to claim 9, wherein:
when the quality parameter is above a threshold value, the estimate of location information is determined based on using the at least one geometric localization technique; or
when the quality parameter is smaller than the threshold value, the estimate of location information is determined based on a trained fingerprinting technique.

11. The server device according to claim 9, wherein the quality parameter for the at least one sample of CSI for the one or more second links is determined based on one or more of:
a received signal strength;
an average Signal to Interference plus Noise Ratio (SINR) of all subcarriers;
a channel capacity;
an Effective Exponential SNR Mapping (EESM) with Multiple Input Multiple Output (MIMO) extensions; or
a statistical confidence interval.

12. The server device according to claim 1, wherein the one or more samples of CSI for the one or more links are determined based on:
estimating a channel for consecutive data packets during a predefined time interval; or
determining a series of vectors corresponding to a frequency response experienced by a set of successive data packets of a used wave-form.

13. The server device according to claim 1, wherein the program further comprises instructions to:
in the training phase, perform the following:
obtain, in parallel, a first estimate of location information of the another device based on the at least one geometric localization technique and a second estimate of location information of the another device based on a trained fingerprint technique; and
update the generated database when an accuracy parameter for the second estimate of location information estimated based on the trained fingerprint technique indicates a better accuracy than an accuracy parameter for the first estimate of location information estimated based on the at least one geometric localization technique.

14. A method, comprising:
in a training phase, obtaining one or more samples of Channel State Information (CSI) for one or more links between another device and at least one Access Point (AP);
obtaining one or more estimates of location information of the another device based on at least one geometric localization technique, each estimate of location information corresponding to at least one sample of the one or more samples of CSI for the one or more links between the another device and the at least one AP;
in the training phase, determining an accuracy parameter for each estimate of location information based on a predefined parameter;
generating a database comprising the one or more samples of CSI of the one or more links, each sample of CSI being associated with at least one estimate of the one or more estimates of location information; and
in the training phase, when a respective accuracy parameter is above a threshold value, update the generated database using the respective accurate parameter.

15. A device, comprising:
at least one processor; and
a non-transitory computer readable storage medium storing a program that is executable by the at least one processor, the program comprising instructions to:
in a testing phase, obtain a database from another device, wherein the database comprises one or more samples of Channel State Information (CSI) of one or more links, each sample of CSI being associated with at least one estimate of one or more estimates of location information;
estimate CSI samples for one or more links between the device and at least one Access Point (AP);
determine a quality parameter for the estimated CSI samples; and
determine a method of determining location information based on the estimated CSI samples of the one or more links, and the quality parameter of the estimated CSI samples.

16. The device according to claim 15, wherein the program further includes instructions to:
in the testing phase, obtain a trained fingerprint technique from the another device; and
wherein the one or more estimates of location information are determined based on the trained fingerprinting technique.

17. A method, comprising:
in a testing phase, obtaining a database from another device, wherein the database comprises one or more samples of channel state information (CSI) of one or more links, each sample of CSI being associated with at least one estimate of one or more estimates of location information;
estimating CSI samples for one or more links between a device and at least one Access Point (AP);
determining a quality parameter for the estimated CSI samples; and
determining a method of determining location information based on the estimated CSI samples of the one or more links, and the quality parameter of the estimated CSI samples.

* * * * *